United States Patent
Maeda et al.

(10) Patent No.: US 12,359,085 B2
(45) Date of Patent: Jul. 15, 2025

(54) PRINTING FILM FROM WHICH PRINTING LAYER CAN BE DETACHED

(71) Applicant: TOYO SEIKAN CO., LTD., Tokyo (JP)

(72) Inventors: Masayuki Maeda, Yokohama (JP); Atsushi Fukahori, Yokohama (JP); Takahiro Yasuumi, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 18/627,974

(22) Filed: Apr. 5, 2024

(65) Prior Publication Data

US 2024/0247164 A1 Jul. 25, 2024

Related U.S. Application Data

(63) Continuation of application No. PCT/JP2022/038332, filed on Oct. 14, 2022.

(30) Foreign Application Priority Data

Oct. 15, 2021 (JP) .................... 2021-169883

(51) Int. Cl.
  *C09D 11/54* (2014.01)
  *C09D 11/102* (2014.01)

(52) U.S. Cl.
  CPC ............ *C09D 11/54* (2013.01); *C09D 11/102* (2013.01)

(58) Field of Classification Search
  None
  See application file for complete search history.

(56) References Cited

U.S. PATENT DOCUMENTS

2016/0303879 A1  10/2016  Yamada et al.

FOREIGN PATENT DOCUMENTS

| EP | 3 892 694 A1 | 10/2021 |
|----|--------------|---------|
| JP | 2003-084670 A | 3/2003 |
| JP | 2014024318 A * | 2/2014 |
| JP | 2015-148794 A | 8/2015 |
| JP | 2020-183252 A | 11/2020 |
| JP | 2021-088408 A | 6/2021 |
| JP | 2021-091476 A | 6/2021 |
| WO | 2020/116339 A1 | 6/2020 |

OTHER PUBLICATIONS

JP2014024318A Machine Translation via EPO (Year: 2014).*
JP2015148794 Machine Translation via EPO (Year: 2015).*
JP2021091476 Machine Translation via EPO (Year: 2021).*
International Search Report for PCT/JP2022/038332, dated Dec. 20, 2022.

* cited by examiner

Primary Examiner — Laura C Powers
(74) Attorney, Agent, or Firm — Sughrue Mion, PLLC

(57) ABSTRACT

The disclosure relates to a printed film including a base film, a removable printed layer containing an alkali-removable ink, and a finishing varnish layer, the layers being formed on the base film. The finishing varnish layer contains at least a curable resin and a curing agent, and the curing agent is blended in an amount of less than 40 parts by mass based on 100 parts by mass of the curable resin. Thus, the printed layer is prevented from being scratched or peeled off and can be reliably removed by alkali treatment at the time of disposal.

5 Claims, 3 Drawing Sheets

PRINTING FILM FROM WHICH PRINTING LAYER CAN BE DETACHED

CROSS REFERENCE TO RELATED APPLICATIONS

This application is a Rule 53(b) Continuation of International Application No. PCT/JP2022/038332 filed on Oct. 14, 2022, claiming priority based on Japanese Patent Application No. 2021-169883 filed on Oct. 15, 2021, the disclosures of which are incorporated herein by reference in their respective entireties.

TECHNICAL FIELD

The disclosure relates to a printed film including a printed layer containing a printing ink removable by alkali treatment, and more particularly to a printed film including a printed layer that is prevented from being scratched or peeled off and can be reliably removed by alkali treatment at the time of disposal.

BACKGROUND

In recent years, from the viewpoint of environmental load reduction, there are demands for recycling of resin packaging containers, and possible material recycling is also desired for a packaging bag formed of a multilayer film.

However, since a plurality of types of plastic materials are mixed in the multilayer film used in the packaging bag, it is necessary to separate the plastic materials from each other for material recycling. In addition, since a printed layer is formed on the packaging bag, only black resin pellets are obtained unless the printing ink is removed, and there is a problem that the application thereof is limited.

In order to solve such problems, JP 2020-183252 A proposes a bag container formed by laminating a non-stretched PET layer and a stretched PET layer, and describes providing a printed layer formed by printing an ink which can be peeled off by a strong alkali solution.

In the above bag container, recycling is facilitated by laminating layers formed of the same type of plastic material without using an adhesive, and the printed layer can be easily removed from a non-stretched PET layer serving as a sealant layer before recycling by forming the printed layer on an exposed surface opposite to the non-stretched PET layer.

SUMMARY

However, in a state in which the printed layer is exposed on the surface of the packaging bag, the printed layer has poor scratch resistance, and the packaging bag has poor slipperiness. Therefore, when packaging bags filled with contents are packed in a box and transported, the packaging bags may collide with one another due to vibration, and their printed layers may be damaged or peeled off. In addition, there is also a possibility that the packaging bags cannot be supplied efficiently when the packaging bags are stacked and stored and then subjected to a filling process of the contents. In order to solve such a problem and to impart a beautiful gloss to the packaging bag, a protective layer is generally formed on the printed layer.

However, when a protective layer capable of achieving the above object is formed using a finishing varnish (top-coat) on a printed layer containing an ink removable by alkali treatment, there arises a new problem that the printed layer cannot be sufficiently removed even by the alkali treatment.

Accordingly, an object of the disclosure is to provide a printed film including a printed layer that can be easily removed by alkali treatment, and having excellent slipperiness and glossiness, wherein the printed layer has scratch resistance.

According to the disclosure, there is provided a printed film including a base film, a removable printed layer containing an alkali-removable ink, and a finishing varnish layer, the layers being formed on the base film, wherein the finishing varnish layer contains at least a curable resin and a curing agent, the curing agent is blended in an amount of less than 40 parts by mass based on 100 parts by mass of the curable resin, and the removable printed layer is removable from the base film by alkali treatment.

In the printed film of the disclosure, suitably, (1) a coating amount of the removable printed layer is 1.2 g/m$^2$ or more;

(2) in an epoxy isocyanate-based finishing varnish in which the curable resin is an epoxy-based resin and the curing agent is an isocyanate-based curing agent, the curing agent is blended in such an amount that an NCO/OH mol ratio is less than 8.4;

(3) in a urethane isocyanate-based finishing varnish in which the curable resin is a urethane-based resin and the curing agent is an isocyanate-based curing agent, the curing agent is blended in such an amount that an NCO/OH mol ratio is less than 21.3;

(4) a coating amount of the removable printed layer is 2.6 g/m$^2$ or more, and the NCO/OH mol ratio in the epoxy isocyanate-based finishing varnish is less than 1.05;

(5) the coating amount of the removable printed layer is 2.6 g/m$^2$ or more, and the NCO/OH mol ratio in the urethane isocyanate-based finishing varnish is less than 1.07;

(6) a coefficient of kinetic friction of a surface of the finishing varnish layer is less than 0.8;

(7) an additional printed layer is formed on the removable printed layer;

(8) the curable resin is an epoxy-based resin, the curing agent is an isocyanate-based curing agent, the coating amount of the removable printed layer is 2.6 g/m$^2$ or more, a coating amount of the additional printed layer is 2.2 g/m$^2$ or more, and the curing agent is blended in such an amount that an NCO/OH mol ratio is less than 4.2;

(9) the curable resin is a urethane-based resin, the curing agent is an isocyanate-based curing agent, the coating amount of the removable printed layer is 2.6 g/m$^2$ or more, the coating amount of the additional printed layer is 2.2 g/m$^2$ or more, and the curing agent is blended in such an amount that an NCO/OH mol ratio is less than 3.2;

(10) a sealant layer is formed on a side of the base film opposite to the removable printed layer; and

(11) the base film is a stretched film containing an olefin resin or a polyester resin, and the sealant layer is an unstretched film or amorphous film containing the same type of resin as that of the base film on which the sealant layer is laminated.

In the printed film of the disclosure, the finishing varnish layer is formed on the printed layer containing an alkali-removable ink (hereinafter may be referred to as an "alkali-removable printed layer"). Nevertheless, the printed layer can be easily removed by alkali treatment, and the printed film has excellent recyclability. Further, when the base film and the sealant layer are formed of the same type of olefin-based resin or polyester resin, separation of different resins is not required, and the recyclability can be further improved.

In addition, since the finishing varnish layer is formed on a surface of the printed film, the printed film exhibits improved handleability when it is formed into a packaging bag, and the printed layer can be effectively prevented from being scratched or peeled off. In particular, when the coefficient of kinetic friction of a surface of the finishing varnish layer is less than 0.8, slipperiness and scratch resistance of the finishing varnish layer are remarkably improved, and the peeling of the printed layer due to vibration during transportation can be effectively prevented. Further, since the finishing varnish layer is formed, the printed film can be provided with excellent surface glossiness.

Further, when an additional layer such as a gravure printed layer is formed between the alkali-removable printed layer and the finishing varnish layer in the printed film of the disclosure, transfer of a curing agent component to the alkali-removable printed layer can be suppressed. Thus, the printed layer can be removed efficiently by alkali treatment, the amount of the curing agent in the finishing varnish layer can be increased, and performance (for example, printed layer protecting effect) required of the finishing varnish layer can also be improved. Further, the thickness of the alkali-removable printed layer can be reduced.

DESCRIPTION OF EMBODIMENTS

Figure 1:
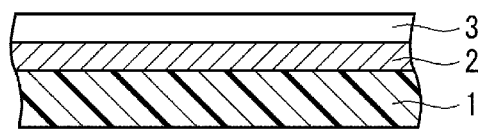
FIG. 1 is a cross-sectional view illustrating an example of a laminated structure of the printed film of the disclosure.

As illustrated in FIG. 1, the printed film of the disclosure includes at least an alkali-removable printed layer 2 containing an alkali-removable ink and a finishing varnish layer 3 formed on a base film 1, and has an important characteristic that the finishing varnish layer containing a curable resin and a curing agent is formed in such a composition that the performance required of the finishing varnish layer, including printed layer protection, scratch resistance, and slipperiness, can be exhibited, but the performance of removing the alkali-removable printed layer by alkali treatment is not impaired.

That is, according to the present inventors' studies, it is considered that, when a finishing varnish is applied as a protective layer onto an alkali-removable printed layer, a finishing varnish component, particularly a curing agent in the finishing varnish diffuses and penetrates into the alkali-removable printed layer, and the alkali-removable ink is crosslinked, or the penetrating finishing varnish component is cured in the vicinity of an interface between the alkali-removable printed layer and the base film, and, as a result, the printed layer cannot be easily removed even by alkali treatment. Therefore, in the disclosure, a composition of a finishing varnish has been found which does not affect the alkali-removable printed layer and can maintain the performance required of the finishing varnish layer.

Finishing Varnish Layer

The finishing varnish layer constituting the printed film of the disclosure is formed of a curable resin and a curing agent, and it is important that the curing agent is blended in an amount of less than 40 parts by mass based on 100 parts by mass of the curable resin. Particularly, it is suitable to blend the curing agent in the amount which will be described below in accordance with the combination of the curable resin and the curing agent, the thickness of the alkali-removable printed layer, or the presence or absence of an additional layer between the finishing varnish layer and the alkali-removable printed layer.

As described above, the curing agent is blended in a specific amount with respect to the curable resin, thereby making it possible to suppress transfer of components of the finishing varnish, particularly the curing agent, to the alkali-removable printed layer, and to reliably remove the alkali-removable printed layer.

As the finishing varnish forming the finishing varnish layer, a curable resin used in a known finishing varnish may be used, but it is particularly suitable to use an epoxy-based resin or a urethane-based resin.

As the curing agent, an isocyanate-based curing agent or an amino-based curing agent known as a curing agent for an epoxy-based resin or a urethane-based resin may be used, but, in the disclosure, it is particularly suitable to use an isocyanate-based curing agent capable of exhibiting excellent curability in a small amount and capable of forming a finishing varnish layer having the above-described performance.

In the disclosure, the use of the specific finishing varnish with a reduced amount of the curing agent as described above makes it possible to suppress the transfer of the curing agent to the alkali-removable printed layer and to suppress crosslinking of the alkali-removable ink, and the alkali-removability of the alkali-removable printed layer described above is not impaired. Furthermore, the coefficient of kinetic friction of the surface of the finishing varnish layer can be controlled to be less than 0.8, and suitably in a range of from 0.1 to 0.3, whereby friction resistance is improved and ink peeling due to vibration during transportation can be effectively prevented.

As the epoxy-based resin, any known epoxy resin can be used, and examples thereof include, but are not limited to, bisphenol A-type epoxy resins, bisphenol F-type epoxy resins, novolac-type epoxy resins, alicyclic epoxy resins, polyethylene glycol glycidyl ether, polyethylene glycol diglycidyl ether, and polyglycerol polyglycidyl ether.

As the urethane-based resin, any known urethane resin can be used, and examples thereof include, but are not limited to, polyether-based urethane resins, polyester-based urethane resins, and polycarbonate-based urethane resins.

Examples of usable isocyanate-based curing agents include aliphatic isocyanates such as trimethylene diisocyanate, tetramethylene diisocyanate, pentamethylene diisocyanate, hexamethylene diisocyanate (HDI), and trimethylhexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norbornene diisocyanate methyl; and multimers such as biurets and nurates and mixtures of these isocyanates. Two or more of these can be used in combination.

When an epoxy isocyanate-based finishing varnish, which is a combination of an epoxy-based resin and an isocyanate-based curing agent, is used as the finishing varnish, the isocyanate-based curing agent is suitably blended so that the mole ratio of a hydroxyl group (OH) of the epoxy-based resin to an isocyanate group (NCO) of the isocyanate-based curing agent (NCO/OH mol ratio) is less than 8.4. When a urethane isocyanate-based finishing varnish, which is a combination of a urethane-based resin and an isocyanate-based curing agent, is used as the finishing varnish, the isocyanate-based curing agent is suitably blended so that the mole ratio of the hydroxyl group (OH) of the urethane-based resin to the isocyanate group (NCO) of the isocyanate-based curing agent (NCO/OH mol ratio) is less than 21.3.

That is, when the NCO/OH mol ratio is equal to or more than the above value, the isocyanate-based curing agent is excessive relative to the epoxy-based resin or the urethane-based resin, and the excessive curing agent which is not used for curing the finishing varnish layer may be transferred to the alkali-removable printed layer, thereby not only inhibiting the removal of the alkali-removable printed layer but also impairing economical efficiency and the performance of the finishing varnish layer. Meanwhile, the lower limit of the NCO/OH mol ratio may be a necessary minimum value at which the finishing varnish layer can be sufficiently cross-linked, and may be a value as close to 0 as possible depending on the curing conditions.

The range of the NCO/OH mol ratio for providing both the performance required of the finishing varnish layer and the removability of the alkali-removable printed layer varies depending on the coating amount (thickness) of the alkali-removable printed layer described below, the presence or absence of an additional printed layer, and the coating amount (thickness) thereof. That is, when the alkali-removable printed layer is thick, or when an additional layer is interposed between the alkali-removable printed layer and the finishing varnish layer, a distance from the finishing varnish layer to the vicinity of the interface between the base film and the alkali-removable printed layer at which the alkali-removable printed layer peels off becomes long, and the curing agent in the finishing varnish hardly reaches the vicinity of the interface. Therefore, the amount of the curing agent in the finishing varnish can be set to be larger than that when the alkali-removable printed layer is thin or when there is no additional layer.

When an epoxy isocyanate-based finishing varnish containing an epoxy-based resin and an isocyanate-based curing agent is used as the finishing varnish, as described above, the coating amount of the alkali-removable printed layer is preferably 1.2 g/m² or more, and the NCO/OH mol ratio is preferably less than 8.4. More preferably, the coating amount of the alkali-removable printed layer is 2.6 g/m² or more, and the NCO/OH mol ratio is less than 1.05, particularly 0.21 or more and 0.525 or less. Thus, as is apparent from results of the Examples described below, the alkali-removable printed layer can be reliably removed by alkali treatment while the performance required of the finishing varnish layer is provided.

When an additional layer, suitably an additional printed layer described below, is interposed between the finishing varnish layer and the alkali-removable printed layer, it is preferable that the coating amount of the alkali-removable printed layer be 2.6 g/m² or more, that the coating amount of the additional printed layer be 2.2 g/m² or more, and that the NCO/OH mol ratio be less than 4.2, particularly 0.21 or more and 3.15 or less.

When a urethane isocyanate-based finishing varnish containing a urethane-based resin and an isocyanate-based curing agent is used as the finishing varnish, as described above, the coating amount of the alkali-removable printed layer is preferably 1.2 g/m² or more, and the NCO/OH mol ratio is preferably less than 3.2. More preferably, the coating amount of the alkali-removable printed layer is 2.6 g/m² or more, and the NCO/OH mol ratio is less than 1.07, particularly 0.27 or more and 0.53 or less. Thus, as is apparent from results of the Examples described below, the alkali-removable printed layer can be reliably removed by alkali treatment while the performance required of the finishing varnish layer is provided.

When an additional layer, suitably an additional printed layer described below, is interposed between the finishing varnish layer and the alkali-removable printed layer, it is preferable that the coating amount of the alkali-removable printed layer be 2.6 g/m² or more, that the coating amount of the additional printed layer be 2.2 g/m² or more, and that the NCO/OH mol ratio be less than 3.2, particularly 0.27 or more and 1.6 or less.

The finishing varnish may be blended with a lubricant such as paraffin wax or polyethylene wax, or a known additive such as an anti-blocking agent as long as transparency of the finishing varnish layer is not impaired.

In the disclosure, the wax is preferably contained in an amount of from 0.1 to 1.0 part by mass per 100 parts by mass of the curable resin. As a result, the coefficient of kinetic friction of the surface of the finishing varnish layer can be controlled to be less than 0.8, particularly in the range of from 0.1 to 0.3, and the slipperiness and scratch resistance of the finishing varnish layer are improved.

The value of the coefficient of kinetic friction of the surface of the finishing varnish layer is a value obtained from results of a vibration test conducted by preparing flat pouches having surfaces with different coefficients of kinetic friction using finishing varnishes containing an epoxy-based resin as a main component and different types and contents of waxes. The test was conducted in accordance with the JIS standard under the same test conditions as in the Examples described below except for a size of the pouches (1 kg volume), a size of corrugated board cartons, and a stacking shape (six pouches were vertically stacked in two rows of three pouches each in a laid state). As a result, when the coefficient of kinetic friction was 0.8 or more, ink peeling of 1 mm or more was observed. The slipperiness and scratch resistance of the finishing varnish layer depend on the value of the coefficient of kinetic friction of the surface of the finishing varnish layer regardless of the composition of the finishing varnish, and it is considered that the above-mentioned preferred range also applies to the finishing varnish layer of the disclosure.

The coating amount of the finishing varnish is preferably in a range of from 0.5 to 2.5 g/m², particularly preferably from 1.4 to 1.7 g/m². When the coating amount is below the above range, the printed layer protecting effect of the finishing varnish layer cannot be sufficiently achieved, whereas when the coating amount exceeds the above range, not only the economical efficiency is inferior, but also the alkali-removability may be impaired as compared with the case where the coating amount falls in the above range.

Alkali-Removable Printed Layer

As the alkali-removable ink constituting the printed film of the disclosure, any known alkali-removable ink can be used as long as the printed layer is removable from the base film by alkali treatment in a state where the finishing varnish layer is formed on the surface of the printed film.

A binder resin of the alkali-removable ink preferably contains, but is not limited to, at least one selected from the group consisting of acrylic resins, urethane resins, polyamide resins, polyester resins, amino resins, phenolic resins, epoxy resins, ethylene-vinyl acetate copolymer resins, vinyl chloride-vinyl acetate copolymer resins, vinyl acetate resins, and cellulose resins.

In the disclosure, the penetration of the finishing varnish component, particularly the curing agent component, into the alkali-removable ink layer is suppressed, and thus it is effective when an alkali-removable ink containing one or a combination of urethane-based resin, epoxy-based resin, polyamide resin, and cellulose resin (nitrocellulose), which are susceptible to the curing agent, is used.

In the alkali-removable ink, any known organic solvent can be used together with the binder resin. Examples of the organic solvent include, but are not limited to, a ketone solvent, a hydrocarbon solvent, an ester solvent, an ether solvent, a glycol ether solvent, and an alcohol solvent. One of these may be used alone, or two or more of these may be used in combination.

The thickness of the alkali-removable printed layer is preferably in a range of 1.2 $g/m^2$ or more, particularly preferably from 2.6 $g/m^2$ to 6.0 $g/m^2$ in terms of coating amount. As a cause of inhibiting the removal of the alkali-removable printed layer by alkali treatment, it is considered that, in the vicinity of the interface between the alkali-removable printed layer and the base film, the finishing varnish component transferred from the finishing varnish layer is cured, or the alkali-removable ink is crosslinked by the curing agent of the finishing varnish, and thus the alkali-removable printed layer cannot be easily removed from the base film. However, when the thickness of the alkali-removable printed layer falls in the above range and the curing agent is blended in such an amount that the NCO/OH mol ratio falls in the above range, the finishing varnish component from the finishing varnish layer does not reach the vicinity of the interface between the printed layer and the base film, and crosslinking in the vicinity of the interface can be suppressed. As a result, even if the alkali-removable ink on the finishing varnish layer side is crosslinked by the curing agent, the alkali-removable ink on the base film side is not crosslinked, and thus the alkali treatment increases the hydrophilicity of the resin in the alkali-removable ink and swells the resin, and the printed layer can be easily removed from the surface of the base film.

Additional Layer

The printed layer in the printed film of the disclosure is not limited to a single layer and may be a multilayer as long as it has an alkali-removable printed layer containing an alkali-removable ink. In the case of a multilayer, it is necessary that the layer containing the alkali-removable ink be positioned on the base film side. Thus, as described above, along with the removal of the alkali-removable printed layer so as to be peeled off from the interface with the base film, the printed layer formed on the layer containing the alkali-removable ink is also removed at the same time.

The alkali-removable printed layer in the multilayer configuration may be a solid printed layer formed by roll coating or a transparent printed layer (medium layer) containing no coloring material, and a gravure printed layer containing an alkali-removable ink or a pattern layer formed by gravure printing using a normal ink which is not an alkali-removable ink may be provided on the solid printed layer or the transparent printed layer.

The printing using the alkali-removable ink can be carried out by any known printing method such as ink jet printing, gravure printing, offset printing, or flexographic printing.

The coating amount (thickness) of an additional printed layer formed between the alkali-removable printed layer and the finishing varnish layer formed on the base film is not particularly limited, but is preferably 2.2 $g/m^2$ or more since the effect of suppressing permeation of the curing agent from the finishing varnish into the alkali-removable printed layer can be achieved, as described above.

Base Film

The base film constituting the printed film of the disclosure can be formed of a thermoplastic resin known per se and capable of film formation. According to the application of the printed film, the thermoplastic resin is appropriately selected from, for example, olefin-based resins such as low-density polyethylene, high-density polyethylene, polypropylene, poly-1-butene, poly-4-methyl-1-pentene, random or block copolymers of α-olefins such as ethylene, propylene, 1-butene, and 4-methyl-1-pentene, and cyclic olefin copolymers; ethylene-vinyl-based copolymer resins such as ethylene-vinyl acetate copolymers, ethylene-vinyl alcohol copolymers, and ethylene-vinyl chloride copolymers; styrene-based resins such as polystyrene, acrylonitrile-styrene copolymers, ABS, and α-methylstyrene-styrene copolymers; vinyl-based resins such as polyvinyl chloride, polyvinylidene chloride, vinyl chloride-vinylidene chloride copolymers, polymethyl acrylate, and polymethyl methacrylate; amide resins such as nylon 6, nylon 6-6, nylon 6-10, nylon 11, and nylon 12; polyester resins such as polyethylene terephthalate, polybutylene terephthalate, and polyethylene naphthalate; polycarbonates; polyphenylene oxides; and biodegradable resins such as polylactic acid.

In the disclosure, among the above thermoplastic resins, an olefin-based resin or a polyester resin can be suitably used from the viewpoints of mechanical strength and printability. By using a base film formed of an olefin-based resin or a polyester resin, it becomes possible to combine a sealant layer formed of the same type of resin as described below, and to omit separation of different resins at the time of recycling.

From the viewpoint of mechanical strength, the base film is preferably a stretched film, and particularly preferably a biaxially stretched film.

The thickness of the base film is not particularly limited, and may be appropriately set within a range of from 5.0 to 50.0 μm, particularly from 10.0 to 30.0 μm, depending on the application.

In the base film, any known additive for a resin, such as a lubricant, an anti-blocking agent, an antistatic agent, or an antioxidant may be blended according to a known formulation.

Layer Configuration

As long as the printed film of the disclosure includes at least the base film, the alkali-removable printed layer, and the finishing varnish layer as described above, the printed film may include an additional layer such as an additional printed layer or a sealant layer. For example, as illustrated in FIG. 2, a removable printed layer 2a containing an alkali-removable ink and a gravure printed layer 2b are formed on a base film 1, a finishing varnish layer 3 is formed on the gravure printed layer 2b, and a sealant layer 4 is formed on a side of the base film layer 1 opposite to the removable printed layer 2a.

In addition to the sealant layer, the printed film may include, for example, any functional resin layer such as a gas barrier resin layer, an easily tearable resin layer, an oxygen-absorbing resin layer, a UV barrier resin layer, a visible light barrier resin layer, a rigid resin layer, an impact-resistant resin layer, a chemical-resistant layer, a puncture-resistant layer, or a heat-resistant layer, or a layer formed of a resin excellent in environmental adaptability such as a reproduction resin, a recycled resin, or a biomass polyester. In the disclosure, in order to improve recyclability, a functional resin layer is preferably provided in which the same type of resin as the base film is used as a base resin and the amounts of other components used are reduced.

Figure 2:
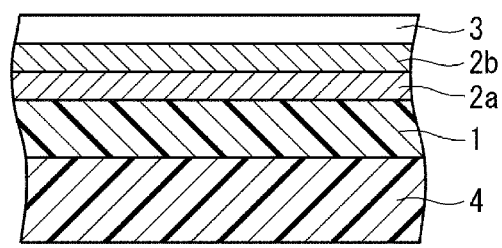
FIG. 2 is a cross-sectional view illustrating another example of the laminated structure of the printed film of the disclosure.

As in the aspect illustrated in FIG. 2, the sealant layer formed on the side of the base film opposite to the alkali-removable printed layer is desirably formed of an olefin-based resin when the base film is formed of an olefin-based resin, or is desirably formed of a polyester resin when the base film is formed of a polyester resin. From the viewpoint of heat sealability, an unstretched film formed by extrusion coating or an amorphous film can be suitably used.

Specifically, when a film formed of an olefin-based resin such as polyethylene or polypropylene is used as the base film, the sealant layer can be formed by extrusion coating of the olefin-based resin such as polyethylene or polypropylene on the base film, whereas when a film formed of a polyester resin such as polyethylene terephthalate or polybutylene terephthalate is used as the base film, an amorphous polyester such as PETG can be suitably used for the sealant layer. The thickness of the sealant layer is not particularly limited but is preferably in a range from 10.0 to 300.0 μm.

Figure 3:
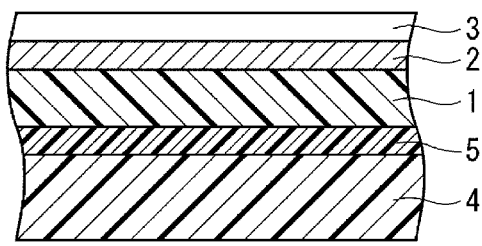
FIG. 3 is a cross-sectional view illustrating another example of the laminated structure of the printed film of the disclosure.

When a functional resin layer as described above is provided, as in the aspect illustrated in FIG. 3, the alkali-removable printed layer 2 and the finishing varnish layer 3 may be formed on one surface of the base film 1, a functional resin layer 5 may be formed on the other surface of the base film 1, and the sealant layer 4 may be formed on the functional resin layer 5. Although not illustrated, the functional resin layer may be formed between the base film and the alkali-removable printed layer.

Production of Printed Film

The printed film of the disclosure can be produced by forming an alkali-removable printed layer on a base film using an alkali-removable ink and then applying a finishing varnish onto the alkali-removable printed layer.

The alkali-removable printed layer is generally formed on the base film by heating (drying) at a temperature of from 50.0 to 100.0° C. for from 0.2 to 10.0 seconds. Next, a finishing varnish is applied onto the formed printed layer using any known means such as roller coating, doctor coating, wire coating, or spray coating. As described above, the content of the curing agent is reduced in the finishing varnish used in the disclosure, and thus it is desirable to appropriately adjust a heating temperature and a heating time depending on the amount of the curing agent. A finishing varnish containing an epoxy-based resin or a urethane-based resin and an isocyanate-based curing agent and/or an amino-based curing agent is formed by heating (drying) at a temperature of from 50.0 to 150.0° C. for from 0.2 to 10.0 seconds, although the disclosure is not limited thereto.

When the sealant layer is formed on the base film, for example, the sealant layer can be laminated directly on the base film by extrusion coating of a resin constituting the sealant layer on the base film, or can be laminated by dry lamination using an adhesive or solventless lamination.

Alkali Treatment

In the printed film of the disclosure, the alkali-removable printed layer is peeled off from the base film by performing alkali treatment. Therefore, only the base film can be separated. Even in the case where a sealant layer is laminated on the base film, when the sealant layer is formed of the same material as that of the base film, they need not be separated from each other in the laminate film, resulting in excellent recyclability.

The alkali treatment can be performed in accordance with the formulation of the alkali-removable ink to be used. For example, the printed layer can be removed by performing immersion treatment at from 70 to 90° C. for from 10 to 20 minutes using an aqueous alkali such as sodium hydroxide or sodium carbonate.

EXAMPLE

Experimental Examples 1 to 5

A film (25 μm thick) formed of low-density polyethylene was used as a base film, and a transparent alkali-removable ink was applied onto the base film in a coating amount of 1.2 g/m² and cured at 70° C. for 10 seconds. Then, an epoxy isocyanate-based coating composition (finishing varnish) having an NCO/OH mol ratio shown in Table 1 was applied onto the transparent printed layer in a coating amount of 1.48 g/m² and cured at 70° C. for 10 seconds to form a finishing varnish layer, thereby preparing a printed film.

As the alkali-removable ink, a commercially available alkali-removable ink containing a polyamide resin and nitrocellulose was used.

Experimental Examples 6 to 10

A finishing varnish layer was formed using an epoxy isocyanate-based coating composition (finishing varnish) having an NCO/OH mol ratio shown in Table 2 in the same manner as in Experimental Example 1, except that the coating amount of the alkali-removable ink was changed to 2.6 g/m², thereby preparing a printed film.

Experimental Examples 11 to 15

A finishing varnish layer was formed using an epoxy isocyanate-based coating composition (finishing varnish) having an NCO/OH mol ratio shown in Table 3 in the same manner as in Experimental Example 1, except that the coating amount of the alkali-removable ink was changed to 5.1 g/m², thereby preparing a printed film.

Experimental Examples 16 to 20

A film (25 μm thick) formed of low-density polyethylene was used as a base film, and a transparent alkali-removable ink was applied onto the base film in a coating amount of 1.2 g/m² and cured at 70° C. for 10 seconds. Then, a urethane isocyanate-based coating composition (finishing varnish) having an NCO/OH mol ratio shown in Table 4 was applied onto the transparent printed layer in a coating amount of 1.61 g/m² and cured at 70° C. for 10 seconds to form a finishing varnish layer, thereby preparing a printed film.

Experimental Examples 21 to 25

A finishing varnish layer was formed using a urethane isocyanate-based coating composition (finishing varnish) having an NCO/OH mol ratio shown in Table 5 in the same manner as in Experimental Example 16, except that the coating amount of the alkali-removable ink was changed to 2.6 g/m², thereby preparing a printed film.

Experimental Examples 26 to 30

A finishing varnish layer was formed using a urethane isocyanate-based coating composition (finishing varnish)

having an NCO/OH mol ratio shown in Table 6 in the same manner as in Experimental Example 16, except that the coating amount of the alkali-removable ink was changed to 5.1 g/m², thereby preparing a printed film.

Experimental Examples 31 to 40

A film (25 μm thick) formed of low-density polyethylene was used as a base film, and a transparent alkali-removable ink was applied onto the base film in a coating amount of 2.6 g/m² and cured at 70° C. for 10 seconds. Then, a printed layer was formed on the transparent printed layer by gravure printing in a coating amount of 2.2 g/m². Then, an epoxy isocyanate-based coating composition (finishing varnish) having an NCO/OH mol ratio shown in Table 7 was applied onto the gravure printed layer in a coating amount of 1.61 g/m² and cured at 70° C. for 10 seconds to form a finishing varnish layer, thereby preparing a printed film.

Experimental Examples 41 to 50

A finishing varnish layer was formed using an epoxy isocyanate-based coating composition (finishing varnish) having an NCO/OH mol ratio shown in Table 8 in the same manner as in Experimental Example 31, except that the coating amount on the gravure printed layer was changed to 5.9 g/m², thereby preparing a printed film.

Experimental Examples 51 to 60

A finishing varnish layer was formed using an epoxy isocyanate-based coating composition (finishing varnish) having an NCO/OH mol ratio shown in Table 9 in the same manner as in Experimental Example 31, except that the coating amount on the gravure printed layer was changed to 11.9 g/m², thereby preparing a printed film.

Experimental Examples 61 to 70

A film (25 μm thick) formed of low-density polyethylene was used as a base film, and a transparent alkali-removable ink was applied onto the base film in a coating amount of 1.2 g/m² and cured at 70° C. for 10 seconds. Then, a printed layer was formed on the transparent printed layer by gravure printing in a coating amount of 2.2 g/m². Then, an epoxy isocyanate-based coating composition (finishing varnish) having an NCO/OH mol ratio shown in Table 10 was applied onto the gravure printed layer in a coating amount of 1.48 g/m² and cured at 70° C. for 10 seconds to form a finishing varnish layer, thereby preparing a printed film.

Experimental Examples 71 to 80

A finishing varnish layer was formed using an epoxy isocyanate-based coating composition (finishing varnish) having an NCO/OH mol ratio shown in Table 11 in the same manner as in Experimental Example 61, except that the coating amount of the alkali-removable ink was changed to 5.1 g/m², thereby preparing a printed film.

Experimental Examples 81 to 90

A film (25 μm thick) formed of low-density polyethylene was used as a base film, and a transparent alkali-removable ink was applied onto the base film in a coating amount of 2.6 g/m² and cured at 70° C. for 10 seconds. Then, a printed layer was formed on the transparent printed layer by gravure printing in a coating amount of 2.2 g/m². Then, a urethane isocyanate-based coating composition (finishing varnish) having an NCO/OH mol ratio shown in Table 12 was applied onto the gravure printed layer in a coating amount of 1.61 g/m² and cured at 70° C. for 10 seconds to form a finishing varnish layer, thereby preparing a printed film.

Experimental Examples 91 to 100

A finishing varnish layer was formed using a urethane isocyanate-based coating composition (finishing varnish) having an NCO/OH mol ratio shown in Table 13 in the same manner as in Experimental Example 81, except that the coating amount on the gravure printed layer was changed to 5.9 g/m², thereby preparing a printed film.

Experimental Examples 101 to 110

A finishing varnish layer was formed using a urethane isocyanate-based coating composition (finishing varnish) having an NCO/OH mol ratio shown in Table 14 in the same manner as in Experimental Example 81, except that the coating amount on the gravure printed layer was changed to 11.9 g/m², thereby preparing a printed film.

Experimental Examples 111 to 120

A film (25 μm thick) formed of low-density polyethylene was used as a base film, and a transparent alkali-removable ink was applied onto the base film in a coating amount of 1.2 g/m² and cured at 70° C. for 10 seconds. Then, a printed layer was formed on the transparent printed layer by gravure printing in a coating amount of 2.2 g/m². Then, a urethane isocyanate-based coating composition (finishing varnish) having an NCO/OH mol ratio shown in Table 15 was applied onto the gravure printed layer in a coating amount of 1.61 g/m² and cured at 70° ° C. for 10 seconds to form a finishing varnish layer, thereby preparing a printed film.

Experimental Examples 121 to 131

A finishing varnish layer was formed using an epoxy isocyanate-based coating composition (finishing varnish) having an NCO/OH mol ratio shown in Table 16 in the same manner as in Experimental Example 111, except that the coating amount of the alkali-removable ink was changed to 5.1 g/m², thereby preparing a printed film.

Experimental Example 132

A film (25 μm thick) formed of low-density polyethylene was used as a base film, and a transparent alkali-removable ink was applied onto the base film in a coating amount of 2.6 g/m² and cured at 70° C. for 10 seconds.

Test for Removal with Alkali

A sample (1.0 cm×1.0 cm) was cut out from each of the printed films prepared in Experimental Examples 1 to 131, and immersed in 0.5% aqueous NaOH solution heated to 85° C. for 20 minutes. The results are shown in tables. Evaluation criteria are as follows.
⊚: 90% or more removed
○: 70% or more and less than 90% removed
Δ: 50% or more and less than 70% removed
x: less than 50% removed Vibration Test Each of the printed films of Experimental Examples 6 and 132 was attached to a side surface of a self-standing pouch filled with 400 ml of a content, and 16 self-standing pouches were packed in a corrugated board carton having a size of W 30 cm×D 23 cm×H 27 cm in such a manner that the surfaces to which the printed films were attached were oriented in the same direction. Then, a vibration test was conducted. Vibration test conditions are as follows.

Vibration type: random vibration (vertical vibration) 23 30 27

Frequency range: from 2 to 200 Hz (in accordance with JIS Z0232 (2020))

Test time: 90 minutes (JIS Z0200 level 2 condition)

No ink peeling occurred in the pouches to which the printed film of Experimental Example 6 was attached. In contrast, ink peeling occurred in the pouches to which the printed film of Experimental Example 132 was attached, the ink adhered to the inner surface of the corrugated board carton packed with the pouches, and scraped-off ink was present at the bottom.

Coefficient of Kinetic Friction

The coefficient of kinetic friction of the surface of each of the printed films of Experimental Examples 6 and 132 was measured. The coefficient of kinetic friction of the surface of the printed film of Experimental Example 6 was 0.16, and the coefficient of kinetic friction of the surface of the printed film of Experimental Example 132 was 0.26. The surface of the film of Experimental Example 6 had a finishing varnish layer, and the coefficient of kinetic friction was less than 0.8, which falls within a preferred range. Thus, no ink peeling occurred. In contrast, the film of Experimental Example 132 had no finishing varnish layer, and the alkali-removable ink layer was exposed. Thus, the coefficient of kinetic friction of the film surface was less than 0.8, but ink peeling was observed. The coefficient of kinetic friction was measured in accordance with JIS K7125.

TABLE 1

| Experimental Example No. | 1 | 2 | 3 | 4 | 5 |
|---|---|---|---|---|---|
| Finishing varnish (epoxy resin/curing agent) | 100/10 | 100/5 | 100/2.5 | 100/1 | 100/0 |
| Coating amount of alkali-removable ink (g/m$^2$) | 1.2 | 1.2 | 1.2 | 1.2 | 1.2 |
| NCO/OH mol ratio | 2.1 | 1.05 | 0.525 | 0.21 | 0 |
| Evaluation of removal with alkali | X | X | X | Δ | ◎ |

TABLE 2

| Experimental Example No. | 6 | 7 | 8 | 9 | 10 |
|---|---|---|---|---|---|
| Finishing varnish (epoxy resin/curing agent) | 100/10 | 100/5 | 100/2.5 | 100/1 | 100/0 |
| Coating amount of alkali-removable ink (g/m$^2$) | 2.6 | 2.6 | 2.6 | 2.6 | 2.6 |
| NCO/OH mol ratio | 2.1 | 1.05 | 0.525 | 0.21 | 0 |
| Evaluation of removal with alkali | X | X | Δ | ○ | ◎ |

TABLE 3

| Experimental Example No. | 11 | 12 | 13 | 14 | 15 |
|---|---|---|---|---|---|
| Finishing varnish (epoxy resin/curing agent) | 100/10 | 100/5 | 100/2.5 | 100/1 | 100/0 |
| Coating amount of alkali-removable ink (g/m$^2$) | 5.1 | 5.1 | 5.1 | 5.1 | 5.1 |
| NCO/OH mol ratio | 2.1 | 1.05 | 0.525 | 0.21 | 0 |
| Evaluation of removal with alkali | X | Δ | ○ | ◎ | ◎ |

TABLE 4

| Experimental Example No. | 16 | 17 | 18 | 19 | 20 |
|---|---|---|---|---|---|
| Finishing varnish (urethane resin/curing agent) | 100/3 | 100/2 | 100/1 | 100/0.5 | 100/0 |
| Coating amount of alkali-removable ink (g/m$^2$) | 1.2 | 1.2 | 1.2 | 1.2 | 1.2 |
| NCO/OH mol ratio | 1.6 | 1.07 | 0.53 | 0.27 | 0 |
| Evaluation of removal with alkali | X | X | X | Δ | ◎ |

TABLE 5

| Experimental Example No. | 21 | 22 | 23 | 24 | 25 |
|---|---|---|---|---|---|
| Finishing varnish (urethane resin/curing agent) | 100/3 | 100/2 | 100/1 | 100/0.5 | 100/0 |
| Coating amount of alkali-removable ink (g/m$^2$) | 2.6 | 2.6 | 2.6 | 2.6 | 2.6 |
| NCO/OH mol ratio | 1.6 | 1.07 | 0.53 | 0.27 | 0 |
| Evaluation of removal with alkali | X | X | Δ | ○ | ◎ |

TABLE 6

| Experimental Example No. | 26 | 27 | 28 | 29 | 30 |
|---|---|---|---|---|---|
| Finishing varnish (urethane resin/curing agent) | 100/3 | 100/2 | 100/1 | 100/0.5 | 100/0 |
| Coating amount of alkali-removable ink (g/m$^2$) | 5.1 | 5.1 | 5.1 | 5.1 | 5.1 |
| NCO/OH mol ratio | 1.6 | 1.07 | 0.53 | 0.27 | 0 |
| Evaluation of removal with alkali | X | Δ | ○ | ◎ | ◎ |

TABLE 7

| Experimental Example No. | 31 | 32 | 33 | 34 | 35 | 36 | 37 | 38 | 39 | 40 |
|---|---|---|---|---|---|---|---|---|---|---|
| Finishing varnish (epoxy resin/curing agent) | 100/40 | 100/30 | 100/25 | 100/20 | 100/15 | 100/10 | 100/5 | 100/2.5 | 100/1 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 |
| Coating amount of alkali-removable ink (g/m$^2$) | 2.6 | 2.6 | 2.6 | 2.6 | 2.6 | 2.6 | 2.6 | 2.6 | 2.6 | 2.6 |
| NCO/OH mol ratio | 8.4 | 6.3 | 5.25 | 4.2 | 3.15 | 2.1 | 1.05 | 0.525 | 0.21 | 0 |
| Evaluation of removal with alkali | x | x | x | x | Δ | Δ | Δ | ○ | ○ | ◎ |

TABLE 8

| Experimental Example No. | 41 | 42 | 43 | 44 | 45 | 46 | 47 | 48 | 49 | 50 |
|---|---|---|---|---|---|---|---|---|---|---|
| Finishing varnish (epoxy resin/curing agent) | 100/40 | 100/30 | 100/25 | 100/20 | 100/15 | 100/10 | 100/5 | 100/2.5 | 100/1 | 100/0 |
| Coating amount of gravure ink (g/m$^2$) | 5.9 | 5.9 | 5.9 | 5.9 | 5.9 | 5.9 | 5.9 | 5.9 | 5.9 | 5.9 |
| Coating amount of alkali-removable ink (g/m$^2$) | 2.6 | 2.6 | 2.6 | 2.6 | 2.6 | 2.6 | 2.6 | 2.6 | 2.6 | 2.6 |
| NCO/OH mol ratio | 8.4 | 6.3 | 5.25 | 4.2 | 3.15 | 2.1 | 1.05 | 0.525 | 0.21 | 0 |
| Evaluation of removal with alkali | x | x | x | x | Δ | Δ | Δ | ○ | ○ | ◎ |

TABLE 9

| Experimental Example No. | 51 | 52 | 53 | 54 | 55 | 56 | 57 | 58 | 59 | 60 |
|---|---|---|---|---|---|---|---|---|---|---|
| Finishing varnish (epoxy resin/curing agent) | 100/40 | 100/30 | 100/25 | 100/20 | 100/15 | 100/10 | 100/5 | 100/2.5 | 100/1 | 100/0 |
| Coating amount of gravure ink (g/m$^2$) | 11.9 | 11.9 | 11.9 | 11.9 | 11.9 | 11.9 | 11.9 | 11.9 | 11.9 | 11.9 |
| Coating amount of alkali-removable ink (g/m$^2$) | 2.6 | 2.6 | 2.6 | 2.6 | 2.6 | 2.6 | 2.6 | 2.6 | 2.6 | 2.6 |
| NCO/OH mol ratio | 8.4 | 6.3 | 5.25 | 4.2 | 3.15 | 2.1 | 1.05 | 0.525 | 0.21 | 0 |
| Evaluation of removal with alkali | x | x | x | Δ | Δ | Δ | Δ | ○ | ○ | ◎ |

TABLE 10

| Experimental Example No. | 61 | 62 | 63 | 64 | 65 | 66 | 67 | 68 | 69 | 70 |
|---|---|---|---|---|---|---|---|---|---|---|
| Finishing varnish (epoxy resin/curing agent) | 100/40 | 100/30 | 100/25 | 100/20 | 100/15 | 100/10 | 100/5 | 100/2.5 | 100/1 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 |
| Coating amount of alkali-removable ink (g/m$^2$) | 1.2 | 1.2 | 1.2 | 1.2 | 1.2 | 1.2 | 1.2 | 1.2 | 1.2 | 1.2 |
| NCO/OH mol ratio | 8.4 | 6.3 | 5.25 | 4.2 | 3.15 | 2.1 | 1.05 | 0.525 | 0.21 | 0 |
| Evaluation of removal with alkali | x | x | x | x | x | x | x | Δ | Δ | ○ |

TABLE 11

| Experimental Example No. | 71 | 72 | 73 | 74 | 75 | 76 | 77 | 78 | 79 | 80 |
|---|---|---|---|---|---|---|---|---|---|---|
| Finishing varnish (epoxy resin/curing agent) | 100/40 | 100/30 | 100/25 | 100/20 | 100/15 | 100/10 | 100/5 | 100/2.5 | 100/1 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 |
| Coating amount of alkali-removable ink (g/m$^2$) | 5.1 | 5.1 | 5.1 | 5.1 | 5.1 | 5.1 | 5.1 | 5.1 | 5.1 | 5.1 |
| NCO/OH mol ratio | 8.4 | 6.3 | 5.25 | 4.2 | 3.15 | 2.1 | 1.05 | 0.525 | 0.21 | 0 |
| Evaluation of removal with alkali | x | Δ | Δ | Δ | Δ | ○ | ○ | ○ | ◎ | ◎ |

TABLE 12

| Experimental Example No. | 81 | 82 | 83 | 84 | 85 | 86 | 87 | 88 | 89 | 90 |
|---|---|---|---|---|---|---|---|---|---|---|
| Finishing varnish (urethane resin/curing agent) | 100/30 | 100/20 | 100/15 | 100/10 | 100/6 | 100/3 | 100/2 | 100/1 | 100/0.5 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 |
| Coating amount of alkali-removable ink (g/m$^2$) | 2.6 | 2.6 | 2.6 | 2.6 | 2.6 | 2.6 | 2.6 | 2.6 | 2.6 | 2.6 |
| NCO/OH mol ratio | 16 | 10.7 | 8 | 5.33 | 3.2 | 1.6 | 1.07 | 0.53 | 0.27 | 0 |
| Evaluation of removal with alkali | x | x | x | x | x | Δ | Δ | ○ | ○ | ◎ |

TABLE 13

| Experimental Example No. | 91 | 92 | 93 | 94 | 95 | 96 | 97 | 98 | 99 | 100 |
|---|---|---|---|---|---|---|---|---|---|---|
| Finishing varnish (urethane resin/curing agent) | 100/30 | 100/20 | 100/15 | 100/10 | 100/6 | 100/3 | 100/2 | 100/1 | 100/0.5 | 100/0 |
| Coating amount of gravure ink (g/m$^2$) | 5.9 | 5.9 | 5.9 | 5.9 | 5.9 | 5.9 | 5.9 | 5.9 | 5.9 | 5.9 |
| Coating amount of alkali-removable ink (g/m$^2$) | 2.6 | 2.6 | 2.6 | 2.6 | 2.6 | 2.6 | 2.6 | 2.6 | 2.6 | 2.6 |

TABLE 13-continued

| Experimental Example No. | 91 | 92 | 93 | 94 | 95 | 96 | 97 | 98 | 99 | 100 |
|---|---|---|---|---|---|---|---|---|---|---|
| NCO/OH mol ratio | 16 | 10.7 | 8 | 5.33 | 3.2 | 1.6 | 1.07 | 0.53 | 0.27 | 0 |
| Evaluation of removal with alkali | x | x | x | x | x | Δ | Δ | ○ | ○ | ◎ |

TABLE 14

| Experimental Example No. | 101 | 102 | 103 | 104 | 105 | 106 | 107 | 108 | 109 | 110 |
|---|---|---|---|---|---|---|---|---|---|---|
| Finishing varnish (urethane resin/curing agent) | 100/30 | 100/20 | 100/15 | 100/10 | 100/6 | 100/3 | 100/2 | 100/1 | 100/0.5 | 100/0 |
| Coating amount of gravure ink (g/m$^2$) | 11.9 | 11.9 | 11.9 | 11.9 | 11.9 | 11.9 | 11.9 | 11.9 | 11.9 | 11.9 |
| Coating amount of alkali-removable ink (g/m$^2$) | 2.6 | 2.6 | 2.6 | 2.6 | 2.6 | 2.6 | 2.6 | 2.6 | 2.6 | 2.6 |
| NCO/OH mol ratio | 16 | 10.7 | 8 | 5.33 | 3.2 | 1.6 | 1.07 | 0.53 | 0.27 | 0 |
| Evaluation of removal with alkali | x | x | x | Δ | Δ | Δ | Δ | ○ | ○ | ◎ |

TABLE 15

| Experimental Example No. | 111 | 112 | 113 | 114 | 115 | 116 | 117 | 118 | 119 | 120 |
|---|---|---|---|---|---|---|---|---|---|---|
| Finishing varnish (urethane resin/curing agent) | 100/30 | 100/20 | 100/15 | 100/10 | 100/6 | 100/3 | 100/2 | 100/1 | 100/0.5 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 |
| Coating amount of alkali-removable ink (g/m$^2$) | 1.2 | 1.2 | 1.2 | 1.2 | 1.2 | 1.2 | 1.2 | 1.2 | 1.2 | 1.2 |
| NCO/OH mol ratio | 16 | 10.7 | 8 | 5.33 | 3.2 | 1.6 | 1.07 | 0.53 | 0.27 | 0 |
| Evaluation of removal with alkali | x | x | x | x | x | x | x | Δ | Δ | ○ |

TABLE 16

| Experimental Example No. | 121 | 122 | 123 | 124 | 125 | 126 | 127 | 128 | 129 | 130 | 131 |
|---|---|---|---|---|---|---|---|---|---|---|---|
| Finishing varnish (urethane resin/curing agent) | 100/40 | 100/30 | 100/20 | 100/15 | 100/10 | 100/6 | 100/3 | 100/2 | 100/1 | 100/0.5 | 100/0 |
| Coating amount of gravure ink (g/m$^2$) | 2.2 | 2.2 | 2.2 | 2.2 | 2.2 | 2.2 | 2.2 | 2.2 | 2.2 | 2.2 | 2.2 |
| Coating amount of alkali-removable ink (g/m$^2$) | 5.1 | 5.1 | 5.1 | 5.1 | 5.1 | 5.1 | 5.1 | 5.1 | 5.1 | 5.1 | 5.1 |
| NCO/OH mol ratio | 21.3 | 16 | 10.7 | 8 | 5.33 | 3.2 | 1.6 | 1.07 | 0.53 | 0.27 | 0 |
| Evaluation of removal with alkali | x | Δ | Δ | Δ | Δ | ○ | ○ | ○ | ○ | ◎ | ◎ |

INDUSTRIAL APPLICABILITY

Since the printed layer of the printed film of the disclosure is prevented from being scratched or peeled off during use and is reliably removable by alkali treatment at the time of disposal, the printed film can be suitably used in a packaging bag that is required to be recycled.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A printed film comprising a base film, a removable printed layer containing an alkali-removable ink, and a finishing varnish layer, the layers being formed on the base film, wherein the finishing varnish layer contains at least a curable resin and a curing agent, the curing agent is blended in an amount of less than 40 parts by mass based on 100 parts by mass of the curable resin, a coating amount of the removable printed layer is 1.2 g/m$^2$ or more and 5.1 g/m$^2$ or less, the curable resin is an epoxy-based resin, and the curing agent is an isocyanate-based curing agent, the curing agent is blended in such an amount that an NCO/OH mol ratio is less than 0.525 when another printed layer is not formed on the removable printed layer and when the coating amount of the removable printed layer is 1.2 g/m$^2$ or more and less than 2.6 g/m$^2$, the curing agent is blended in such an amount that the NCO/OH mol ratio is less than 1.05 when another printed layer is not formed on the removable printed layer and when the coating amount of the removable printed layer is 2.6 g/m$^2$ or more and 5.1 g/m$^2$ or less, the curing agent is blended in such an amount that the NCO/OH mol ratio is less than 1.05 when another printed layer is formed on the removable printed layer such that a coating amount of the another printed layer is 2.2 g/m$^2$ or more and 11.9 g/m$^2$ or less and when the coating amount of the removable printed layer is 1.2 g/m$^2$ or more and less than 2.6 g/m$^2$, the curing agent is blended in such an amount that the NCO/OH mol ratio is less than 4.2 when another printed layer is formed on the removable printed layer such that a coating amount of the another printed layer is 2.2 g/m$^2$ or more and 11.9 g/m$^2$ or less and when the coating amount of the removable printed layer is 2.6 g/m² or more and 5.1 g/m² or less, and the removable printed layer is removable from the base film by alkali treatment.

2. The printed film according to claim 1, wherein a coefficient of kinetic friction of a surface of the finishing varnish layer is 0.1 to 0.3.

3. The printed film according to claim 1, wherein a sealant layer is formed on a side of the base film opposite to the removable printed layer.

4. The printed film according to claim 3, wherein the base film is a stretched film containing an olefin resin or a polyester resin, and the sealant layer is an unstretched film or amorphous film containing the same type of resin as that of the base film on which the sealant layer is laminated.

5. A printed film comprising a base film, a removable printed layer containing an alkali-removable ink, and a finishing varnish layer, the layers being formed on the base film, wherein the finishing varnish layer contains at least a curable resin and a curing agent, the curing agent is blended in an amount of less than 40 parts by mass based on 100 parts by mass of the curable resin, a coating amount of the removable printed layer is 1.2 g/m² or more and 5.1 g/m² or less, the curable resin is a urethane-based resin, and the curing agent is an isocyanate-based curing agent, the curing agent is blended in such an amount that an NCO/OH mol ratio is less than 0.53 when another printed layer is not formed on the removable printed layer and when the coating amount of the removable printed layer is 1.2 g/m² or more and less than 2.6 g/m², the curing agent is blended in such an amount that the NCO/OH mol ratio is less than 1.07 when another printed layer is not formed on the removable printed layer and when the coating amount of the removable printed layer is 2.6 g/m² or more and 5.1 g/m² or less, the curing agent is blended in such an amount that the NCO/OH mol ratio is less than 1.07 when another printed layer is formed on the removable printed layer such that a coating amount of the another printed layer is 2.2 g/m² or more and 11.9 g/m² or less and when the coating amount of the removable printed layer is 1.2 g/m² or more and less than 2.6 g/m², the curing agent is blended in such an amount that the NCO/OH mol ratio is less than 3.2 when another printed layer is formed on the removable printed layer such that a coating amount of the another printed layer is 2.2 g/m² or more and 11.9 g/m² or less and when the coating amount of the removable printed layer is 2.6 g/m² or more and 5.1 g/m² or less, and the removable printed layer is removable from the base film by alkali treatment.

* * * * *